(12) United States Patent
Li et al.

(10) Patent No.: US 10,324,931 B2
(45) Date of Patent: *Jun. 18, 2019

(54) DYNAMIC COMBINATION OF PROCESSES FOR SUB-QUERIES

(71) Applicant: International Business Machines Corporation, Armonk, NY (US)

(72) Inventors: Shuo Li, Beijing (CN); Meng Wan, Beijing (CN); Xiaobo Wang, Beijing (CN); Xin Ying Yang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 572 days.

This patent is subject to a terminal disclaimer.

(21) Appl. No.: 15/016,763

(22) Filed: Feb. 5, 2016

(65) Prior Publication Data

US 2017/0228420 A1    Aug. 10, 2017

(51) Int. Cl.
*G06F 16/00* (2019.01)
*G06F 16/2453* (2019.01)
*G06F 16/2452* (2019.01)
*G06F 16/2455* (2019.01)

(52) U.S. Cl.
CPC .... *G06F 16/24549* (2019.01); *G06F 16/2454* (2019.01); *G06F 16/24524* (2019.01); *G06F 16/24535* (2019.01); *G06F 16/24539* (2019.01); *G06F 16/24545* (2019.01); *G06F 16/24557* (2019.01)

(58) Field of Classification Search
CPC ......... G06F 17/30451; G06F 17/30457; G06F 17/3046; G06F 16/2454; G06F 16/24524; G06F 16/24535
See application file for complete search history.

(56) References Cited

U.S. PATENT DOCUMENTS

| 6,341,281 B1 | 1/2002 | MacNicol |
| RE37,965 E | 1/2003 | Jhingran et al. |
| 7,080,062 B1 | 7/2006 | Leung |
| 7,539,667 B2 | 5/2009 | Lindsay et al. |
| 8,126,873 B2 | 2/2012 | Downer et al. |
| 2011/0082856 A1* | 4/2011 | Subbiah ............ G06F 17/30463 707/718 |
| 2012/0191698 A1* | 7/2012 | Albrecht ........... G06F 17/30442 707/718 |

(Continued)

OTHER PUBLICATIONS

U.S. Appl. No. 15/067,560, filed Mar. 11, 2016.

(Continued)

*Primary Examiner* — Grace Park
(74) *Attorney, Agent, or Firm* — Alexander G. Jochym

(57) ABSTRACT

A tool for combining common processes shared by at least two or more sub-queries within a query is provided. The tool determines the query with the at least two or more sub-queries. The tool determines whether one or more sub set relationships are shared between the at least two or more sub-queries. Responsive to a determination that one or more sub set relationships are shared between the at least two or more sub-queries, the tool determines an order class for the at least two or more sub-queries based on the one or more sub set relationships. The tool determines an access path for the query. The tool executes the access path during run-time for data accessing.

17 Claims, 3 Drawing Sheets

(56) References Cited

U.S. PATENT DOCUMENTS

2015/0088919 A1    3/2015  Hunter et al.
2017/0060947 A1*   3/2017  Zhang .............. G06F 17/30463

OTHER PUBLICATIONS

U.S. Appl. No. 15/366,523, filed Dec. 1, 2016; Entitled "Dynamic Combination of Processes for Sub-Queries".
U.S. Appl. No. 15/366,712, filed Dec. 1, 2016; Entitled "Dynamic Combination of Processes for Sub-Queries ".
Appendix P (List of IBM Patents or Patent Applications Treated As Related), 2 pages, filed herewith.
Chen et al., "Optimization of Sub-Query Processing in Distributed Data Integration Systems", Copyright © 2010 Elsevier Ltd., vol. 34, Issue 4, Jul. 2011, pp. 1035-1042, Advanced Topics in Cloud Computing, Journal of Network and Computer Applications, Jun. 7, 2010.
Appendix P (List of IBM Patents or Patent Applications Treated As Related), 2 pages, filed Mar. 11, 2016.

* cited by examiner

DYNAMIC COMBINATION OF PROCESSES FOR SUB-QUERIES

BACKGROUND OF THE INVENTION

The present invention relates generally to database queries, and more particularly to performance enhancements for database queries containing multiple sub-queries.

Database management systems may utilize Structured Query Language (SQL) for data query processes and database access. SQL is a special-purpose programming language designed for managing data held in a relational database management system (RDBMS), or for stream processing in a relational data stream management system (RDSMS). With growth in big data analytics and data analyzing, SQL queries for statistics may expand.

SUMMARY

Aspects of an embodiment of the present invention disclose a method, a computer system, and a computer program product for combining common processes shared by at least two or more sub-queries within a query, in accordance with an embodiment of the present invention. The method includes determining, by one or more computer processors, the query with the at least two or more sub-queries. The method includes determining, by the one or more computer processors, whether one or more sub set relationships are shared between the at least two or more sub-queries. Responsive to a determination that one or more sub set relationships are shared between the at least two or more sub-queries, determining, by the one or more computer processors, an order class for the at least two or more sub-queries based on the one or more sub set relationships. The method includes determining, by the one or more computer processors, an access path for the query. The method includes executing, by the one or more computer processors, the access path during run-time for data accessing.

DETAILED DESCRIPTION

Embodiments of the present invention recognize that to obtain different result values from two nearly identical sub-queries, processes are repeated multiple times. Embodiments of the present invention recognize that duplicated processes of similar sub-queries increase SQL execution and process costs. Embodiments of the present invention further recognize that common table expressions (CTEs) do not provide an index, and often require a database to restore a temporary table as a work file in order to process a query request, which ultimately increases SQL execution and process costs.

Embodiments of the present invention provide the capability to reduce costs associated with similar queries and expedite SQL execution of data queries containing multiple sub-queries with sub set relationships. Embodiments of the present invention provide the capability to adopt previous temporary result sets generated from sub-queries based on shared sub set relationships instead of relying on full table access. Embodiments of the present invention provide the capability to determine sub set relationships between at least two or more sub-queries of a query, and combine common processes shared by the at least two or more sub-queries to enhance the performance of the query containing multiple sub-queries.

Implementation of such embodiments may take a variety of forms, and exemplary implementation details are discussed subsequently with reference to the Figures.

Figure 1:
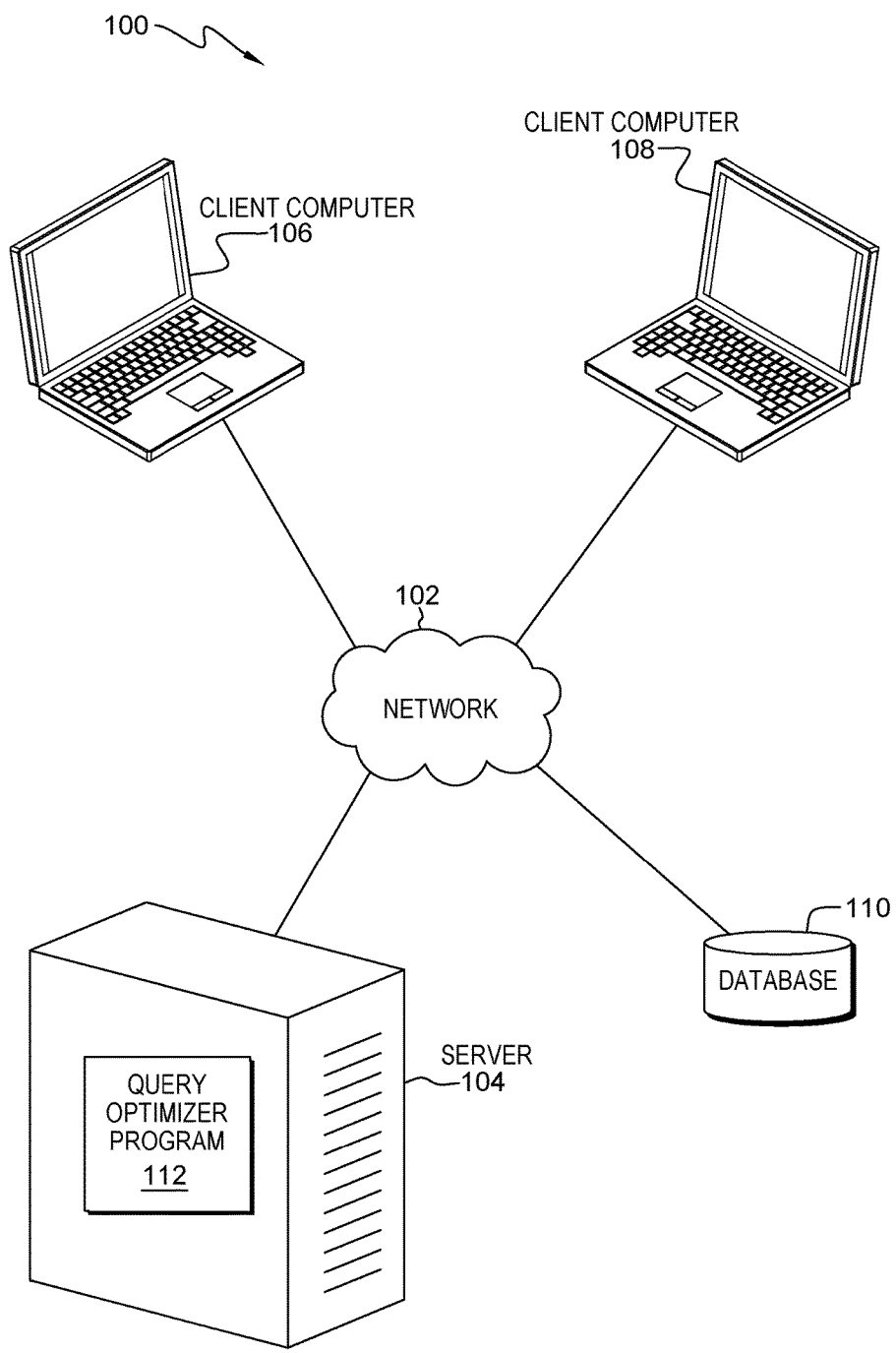
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, and one or more client computers, such as client computer 106 and client computer 108, and database 110.

In one embodiment, network 102 is the Internet representing a worldwide collection of networks and gateways that use TCP/IP protocols to communicate with one another. Network 102 may include wire cables, wireless communication links, fiber optic cables, routers, switches, and/or firewalls. Server 104, client computer 106, client computer 108, and database 110 are interconnected by network 102. Network 102 can be any combination of connections and protocols capable of supporting communications between server 104, client computer 106, client computer 108, database 110 and query optimizer program 112. Network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments.

In one embodiment, server 104 may be, for example, a server computer system, such as a database server, a management server, a web server, a structured query language server, or any other electronic device or computing system capable of sending and receiving data. In another embodiment, server 104 may be a data center consisting of a collection of networks and servers providing an IT service, such as virtual servers and applications deployed on virtual servers, to an external party. In one embodiment, server 104 may be a database server operating on a legacy system, such as a mainframe system. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In the exemplary embodiment, server 104 includes query optimizer program 112 for combining common processes shared by at least two or more sub-queries to reduce costs associated with similar queries and expedite SQL execution.

In one embodiment, query optimizer program 112 operates on a central server, such as server 104, and can be utilized by one or more client computers, such as client computer 106 and client computer 108, via network 102. In another embodiment, query optimizer program 112 may be a software-based program downloaded from the central server, such as server 104, or a third-party provider (not shown), and executed on a client computer, such as client computer 106 and client computer 108, to combine common processes shared by at least two or more sub-queries to reduce costs associated with similar queries and expedite SQL execution. In another embodiment, query optimizer program 112 may be a software-based program, downloaded from a central server, such as server 104, and installed on one or more client devices, such as client computer 106 and client computer 108. In yet another embodiment, query optimizer program 112 may be utilized as a software service provided by a third-party cloud service provider (not shown). In yet another embodiment, query optimizer program 112 may include one or more software-based components, such as add-ons, plug-ins, and agent programs, etc., installed on one or more client devices, such as client computer 106 and client computer 108, to combine common processes shared by at least two or more sub-queries to reduce costs associated with similar queries and expedite SQL execution.

In one embodiment, query optimizer program 112 is a software-based program for combining common processes shared by at least two or more sub-queries to reduce costs associated with similar queries and expedite SQL execution. In one embodiment, query optimizer program 112 provides a mechanism for reducing costs associated with similar queries and expediting SQL execution by combining common processes shared by at least two or more sub-queries. In one embodiment, query optimizer program 112 detects there are at least two or more sub-queries in an SQL query. In one embodiment, query optimizer program 112 determines whether the at least two or more sub-queries share similar basic data access processes (e.g., access paths). In one embodiment, query optimizer program 112 combines similar basic data access processes together to avoid duplicated processes in order to achieve a desired results set.

In one embodiment, client computer 106 and client computer 108 are clients to server 104 and may be, for example, a server, a desktop computer, a laptop computer, a tablet computer, a personal digital assistant (PDA), a smart phone, a thin client, or any other electronic device or computing system capable of communicating with server 104 through network 102. For example, client computer 106 and client computer 108 may be a laptop computer capable of connecting to a network, such as network 102, to submit one or more data queries to a central server to utilize a software-based program, such as query optimizer program 112 of server 104. In one embodiment, client computer 106 and client computer 108 may be any suitable type of client device capable of submitting one or more data queries to a database server (e.g., SQL server). In one embodiment, client computer 106 and client computer 108 include a user interface (not shown) for submitting data queries to a database server, such as server 104. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curves of command-line interfaces, which required commands to be typed on the keyboard. The actions in GUIs are often performed through direct manipulation of the graphics elements.

In one embodiment, database 110 is a storage device (e.g., storage repository, database, etc.) interconnected with a database server, such as server 104. In one embodiment, database 110 provides the capability to store data accessible by SQL executions and data queries.

Figure 2:
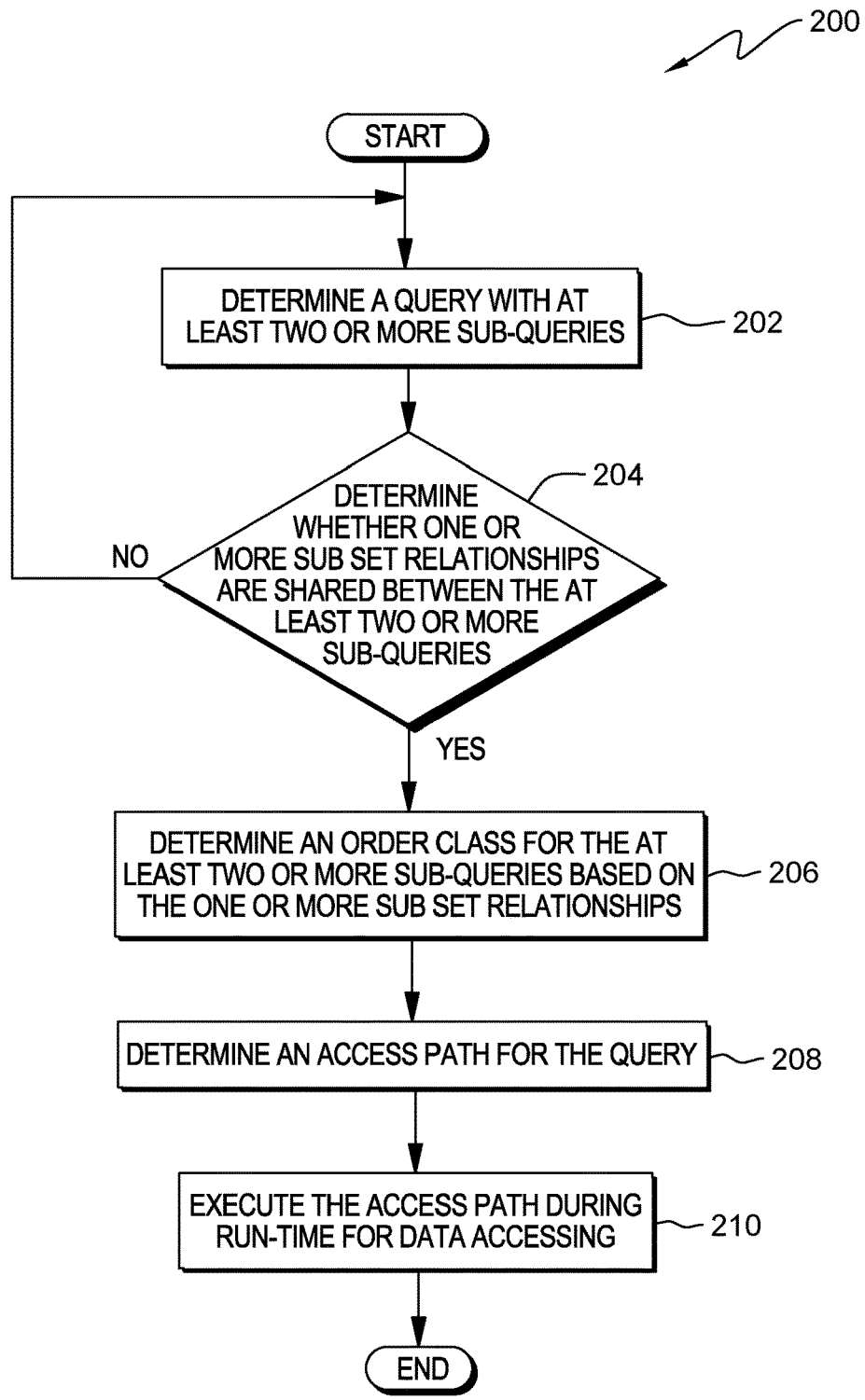
FIG. 2 is a flowchart depicting operational steps of a query optimizer program, in accordance with an embodiment of the present invention.

FIG. 2 depicts a flowchart of operational steps of a query optimizer program, such as query optimizer program 112 of FIG. 1, generally designated 200, for combining common processes shared by at least two or more sub-queries to reduce costs associated with similar queries and expedite SQL execution, in accordance with an embodiment of the present invention.

Query optimizer program 112 determines a query with at least two or more sub-queries (202). In one embodiment, responsive to a database server, such as server 104, receiving a query (SQL query) from a client computer, such as client computer 106 and client computer 108, query optimizer program 112 determines a query with at least two or more sub-queries by scanning the query to determine whether there are at least two or more sub-queries within the query. In one embodiment, query optimizer program 112 scans the query for at least two distinct data processes within the query SQL (textual language, command language, etc.), where the at least two distinct data processes may be indicated by query language, such as textual query language, command language, query type, and a transition term between the at least two distinct data processes, etc. For example, responsive to receiving a query for statistics on how many devices are related in a table and how many records are located in the table, query optimizer program 112 may scan the query and determine that the query includes two sub-queries evidenced by two distinct query types having differing command language, such as a MALL_COMMAND sub-query and a STORE_OUT sub-query in the SQL process.

Query optimizer program 112 determines whether one or more sub set relationships are shared between the at least two or more sub-queries (204). In one embodiment, query optimizer program 112 determines whether one or more sub set relationships, such as common data processes, are shared between the at least two or more sub-queries by analyzing respective predicates within the at least two or more sub-queries. For example, query optimizer program 112 may analyze respective predicates of two sub-queries and determine that the data processes share common data processes, such as a first sub-query requiring a common data process shared by a second sub-query, and that differ in at least one aspect, such as the first sub-query differing from the second sub-query by requiring a count number of devices, where the second sub-query instead requires a distinct list of the devices, and in this case, query optimizer program 112 may determine that the two sub-queries share sub-set relationships (i.e., similar or same shared data processes) and differ in at least one aspect of the shared data processes. Where query optimizer program 112 determines that at least two or more sub-queries share similar data processes, query optimizer program 112 determines that one or more sub set relationships are shared between the at least two or more queries. Where query optimizer program 112 determines that at least two or more sub-queries do not share similar data processes, query optimizer program 112 determines that one or more sub set relationships are not shared between the at least two or more queries.

Responsive to a determination that at least two or more sub-queries do not share similar data processes, query optimizer program 112 determines that one or more sub set relationships are not shared between the at least two or more queries (NO branch, 204), query optimizer program 112 returns to detecting a query with at least two or more sub-queries (202).

Responsive to a determination that similar data processes are shared between the at least two or more sub-queries, query optimizer program 112 determines that one or more sub set relationships are shared between the at least two or more sub-queries (YES branch 204), query optimizer program 112 determines an order class for the at least two or more sub-queries based on the one or more sub set relationships (206). In one embodiment, query optimizer program 112 determines an order class for the at least two or more sub-queries, where an order class is an order of one or more data processes within the query based, at least in part, on query style, type, function, etc. In another embodiment, an order class may be based on the one or more sub set relationships. In yet another embodiment, an order class is an order of one or more data processes as they appear in the SQL of a query as is known in the art. In one embodiment, query optimizer program 112 may determine an order class for the at least two or more sub-queries by marking common data processes shared between the one or more sub-queries, combining common data processes of the two or more sub-queries into a single shared common process, and transforming the query (e.g., SQL transformation, transforming a parse tree, etc.) to include the differing data processes within the single shared common process, with the differing data processes arranged based on a query style, a query type, and a query function, etc. In one embodiment, query optimizer program 112 may replace the original location of the data processes with a signed node.

Query optimizer program 112 determines an access path for the query (208). In one embodiment, based on a query transformation, query optimizer program 112 determines an access path for the query based, at least in part, on a comparison of a cost associated with dynamically generating a temporary result set against some sub-queries that may be reused by other sub-queries with a cost associated with the at least two or more sub-queries of the original query accessing one or more base tables. In one embodiment, query optimizer program 112 may determine the cost associated with dynamically generating a temporary result set against some sub-queries that may be reused by other sub-queries, and determine the cost associated with the at least two or more sub-queries of the original query accessing one or more base tables, wherein the cost may be a performance cost, a financial cost, and a time cost, etc. In another embodiment, query optimizer program 112 may retrieve the cost associated with dynamically generating a temporary result set against some sub-queries that may be reused by other sub-queries, and the cost associated with the at least two or more sub-queries of the original query accessing one or more base tables from a database, such as database 110. In one embodiment, query optimizer program 112 generates an access path for the single shared common process, where the access path includes one or more different branches in a parse tree for respective differing data processes of the at least two or more sub-queries within the single shared common process. For example, query optimizer program 112 may generate an access path that includes a first branch for a count value, and a second branch for a distinct list, such that query returns two distinct result sets. In one embodiment, responsive to a determination that the cost associated with dynamically generating a temporary result set against some sub-queries that may be reused by other sub-queries is less than the cost associated with the at least two or more sub-queries of the original query accessing one or more base tables from a database, query optimizer program 112 generates a plurality of temporary results sets against some sub-queries for the adoption of other sub-queries instead of accessing one or more base tables for results sets, thereby effectively expediting SQL execution and enhancing the performance of the query.

Query optimizer program 112 executes the access path during run-time for data accessing (210). In one embodiment, query optimizer program 112 connects the plurality of temporary results sets and the single shared common process (i.e., the transformed query). In one embodiment, query optimizer program 112 supports the access path with the single shared common process for data accessing, and returns one or more results sets based, at least in part, on the number of different branches in the query. For example, typically a single result set is returned for a single sub-query, however, the access path with the single shared common process returns two result sets, such as one for a count value and one for a distinct list, as the distinct data processes for each are combined in the single shared common process as different branches, such that each distinct data process branch is executed simultaneously in the query to avoid multiple repetitions of the query to achieve the same result sets.

Figure 3:
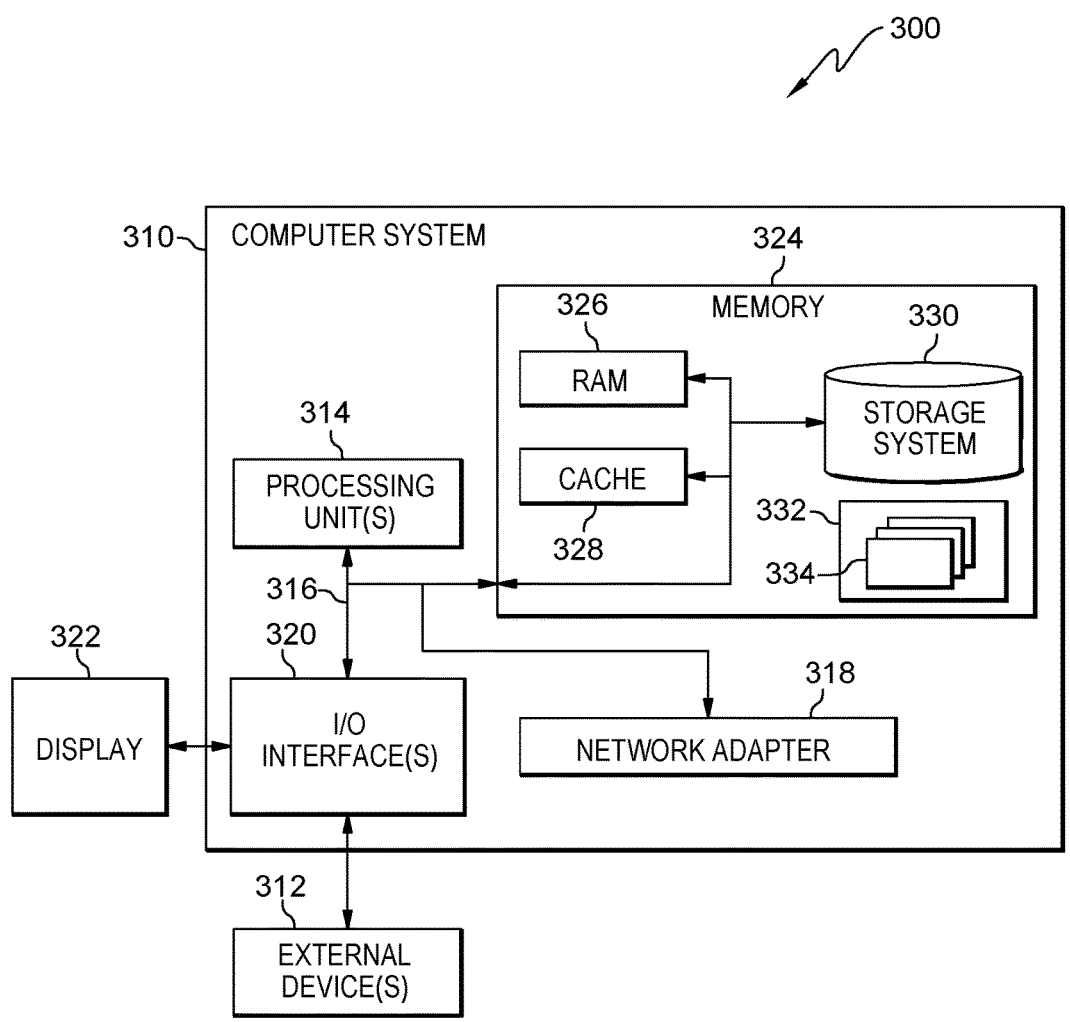
FIG. 3 is a block diagram depicting components of a data processing system (such as the server of FIG. 1), in accordance with an embodiment of the present invention.

FIG. 3 depicts a block diagram of components of data processing system, such as server 104 of FIG. 1, generally designated 300, in accordance with an illustrative embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 310. The components of computer system 310 may include, but are not limited to, one or more processors or processing unit(s) 314, memory 324, and bus 316 that couples various system components including memory 324 to processing unit(s) 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk, such as a CD-ROM, DVD-ROM, or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external device(s) 312, such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks, such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for combining common processes shared by at least two or more sub-queries within a query, the method comprising:
   determining, by one or more computer processors, the query with the at least two or more sub-queries;
   determining, by the one or more computer processors, whether one or more sub set relationships are shared between the at least two or more sub-queries;
   responsive to a determination that one or more sub set relationships are shared between the at least two or more sub-queries, determining, by the one or more computer processors, an order class for the at least two or more sub-queries based on the one or more sub set relationships, wherein determining the order class includes marking one or more common data processes shared between the at least two or more sub-queries, combining the one or more common data processes of the at least two or more sub-queries into a single shared common process, transforming the query to include one or more differing aspects within the single shared common process, with the one or more differing aspects arranged based, at least in part, on a query style, a query type, and a query function, and replacing an original location of the one or more common data processes with a signed node;
   determining, by the one or more computer processors, an access path for the query; and
   executing, by the one or more computer processors, the access path during run-time for data accessing.

2. The method of claim 1, wherein determining the query with the at least two or more sub-queries, further comprises:
   scanning, by the one or more computer processors, the query to determine whether there are at least two or more sub-queries within the query.

3. The method of claim 1, wherein determining whether one or more sub set relationships are shared between the at least two or more sub-queries, further comprises:
   determining, by the one or more computer processors, whether the at least two or more sub-queries share a common data process and differ in at least one aspect of the common data process, wherein determining includes analyzing one or more respective predicates of the at least two or more sub-queries.

4. The method of claim 3, further comprises:
   responsive to a determination that the at least two or more sub-queries share a common data process and differ in at least one aspect of the common data process, determining, by the one or more computer processors, one or more sub set relationships are shared between the at least two or more sub-queries; and
   responsive to a determination that the at least two or more sub-queries do not share a common data process and do not differ in at least one aspect of the common data process, determining, by the one or more computer processors, one or more sub set relationships are not shared between the at least two or more sub-queries.

5. The method of claim 1, wherein determining an access path for the query, further comprises:
   determining, by the one or more computer processors, a cost associated with dynamically generating a temporary result set against some sub-queries that may be reused by one or more other sub-queries;
   determining, by the one or more computer processors, a cost associated with the at least two or more sub-queries of the query accessing one or more base tables; and
   responsive to a determination that the cost associated with dynamically generating the temporary result set against some sub-queries that may be reused by the one or more other sub-queries is less than the cost associated with the at least two or more sub-queries of the query accessing the one or more base tables, generating, by the one or more computer processors, an access path for a single shared common process, wherein the access path includes two or more different branches in a parse tree for each of two or more differing aspects within the single shared common process, wherein the two or more different branches return two or more results sets.

6. The method of claim 5, further comprises:
responsive to a determination that the cost associated with dynamically generating the temporary result set against some sub-queries that may be reused by the one or more other sub-queries is less than the cost associated with the at least two or more sub-queries of the query accessing the one or more base tables, generating, by the one or more computer processors, a plurality of temporary results sets against the at least two or more sub-queries for adoption by the one or more other sub-queries instead of accessing the one or more base tables for results sets.

7. A computer program product for combining common processes shared by at least two or more sub-queries within a query, the computer program product comprising:
one or more computer readable storage media and program instructions stored on the one or more computer readable storage media, the program instructions comprising:
program instructions to determine the query with the at least two or more sub-queries;
program instructions to determine whether one or more sub set relationships are shared between the at least two or more sub-queries;
responsive to a determination that one or more sub set relationships are shared between the at least two or more sub-queries, program instructions to determine an order class for the at least two or more sub-queries based on the one or more sub set relationships, wherein determining the order class includes marking one or more common data processes shared between the at least two or more sub-queries, combining the one or more common data processes of the at least two or more sub-queries into a single shared common process, transforming the query to include one or more differing aspects within the single shared common process, with the one or more differing aspects arranged based, at least in part, on a query style, a query type, and a query function, and replacing an original location of the one or more common data processes with a signed node;
program instruction to determine an access path for the query; and
program instructions to execute the access path during run-time for data accessing.

8. The computer program product of claim 7, wherein program instructions to determine the query with the at least two or more sub-queries, further comprise:
program instructions to scan the query to determine whether there are at least two or more sub-queries within the query.

9. The computer program product of claim 7, wherein program instructions to determine whether one or more sub set relationships are shared between the at least two or more sub-queries, further comprise:
program instructions to determine whether the at least two or more sub-queries share a common data process and differ in at least one aspect of the common data process, wherein determining includes analyzing one or more respective predicates of the at least two or more sub-queries.

10. The computer program product of claim 9, further comprising:
responsive to a determination that the at least two or more sub-queries share a common data process and differ in at least one aspect of the common data process, program instructions to determine one or more sub set relationships are shared between the at least two or more sub-queries; and
responsive to a determination that the at least two or more sub-queries do not share a common data process and do not differ in at least one aspect of the common data process, program instructions to determine one or more sub set relationships are not shared between the at least two or more sub-queries.

11. The computer program product of claim 7, wherein program instructions to determine an access path for the query, further comprise:
program instructions to determine a cost associated with dynamically generating a temporary result set against some sub-queries that may be reused by one or more other sub-queries;
program instructions to determine a cost associated with the at least two or more sub-queries of the query accessing one or more base tables; and
responsive to a determination that the cost associated with dynamically generating the temporary result set against some sub-queries that may be reused by the one or more other sub-queries is less than the cost associated with the at least two or more sub-queries of the query accessing the one or more base tables, program instructions to generate an access path for a single shared common process, wherein the access path includes two or more different branches in a parse tree for each of two or more differing aspects within the single shared common process, wherein the two or more different branches return two or more results sets.

12. The computer program product of claim 11, further comprising:
responsive to a determination that the cost associated with dynamically generating the temporary result set against some sub-queries that may be reused by the one or more other sub-queries is less than the cost associated with the at least two or more sub-queries of the query accessing the one or more base tables, program instructions to generate a plurality of temporary results sets against the at least two or more sub-queries for adoption by the one or more other sub-queries instead of accessing the one or more base tables for results sets.

13. A computer system for combining common processes shared by at least two or more sub-queries within a query, the computer system comprising:
one or more computer processors;
one or more computer readable storage media;
program instructions stored on at least one of the one or more computer readable storage media for execution by at least one of the one or more computer processors, the program instructions comprising:
program instructions to program instructions to determine the query with the at least two or more sub-queries;
program instructions to determine whether one or more sub set relationships are shared between the at least two or more sub-queries;
responsive to a determination that one or more sub set relationships are shared between the at least two or more sub-queries, program instructions to determine an order class for the at least two or more sub-queries based on the one or more sub set relationships, wherein determining the order class includes marking one or more common data processes shared between the at least two or more sub-queries, combining the one or more common data processes of the at least two or more sub-queries into a single shared common process, transforming the query to include one or more differing aspects within the single shared common process, with the one or more differing aspects arranged based, at least in part, on a query style, a query type, and a query function, and replacing an original location of the one or more common data processes with a signed node;

program instruction to determine an access path for the query; and program instructions to execute the access path during run-time for data accessing.

14. The computer system of claim 13, wherein program instructions to determine the query with the at least two or more sub-queries, further comprise:

program instructions to scan the query to determine whether there are at least two or more sub-queries within the query.

15. The computer system of claim 13, wherein program instructions to determine whether one or more sub set relationships are shared between the at least two or more sub-queries, further comprise:

program instructions to determine whether the at least two or more sub-queries share a common data process and differ in at least one aspect of the common data process, wherein determining includes analyzing one or more respective predicates of the at least two or more sub-queries.

16. The computer system of claim 15, further comprising:

responsive to a determination that the at least two or more sub-queries share a common data process and differ in at least one aspect of the common data process, program instructions to determine one or more sub set relationships are shared between the at least two or more sub-queries; and responsive to a determination that the at least two or more sub-queries do not share a common data process and do not differ in at least one aspect of the common data process, program instructions to determine one or more sub set relationships are not shared between the at least two or more sub-queries.

17. The computer system of claim 13, wherein program instructions to determine an access path for the query, further comprise:

program instructions to determine a cost associated with dynamically generating a temporary result set against some sub-queries that may be reused by one or more other sub-queries;

program instructions to determine a cost associated with the at least two or more sub-queries of the query accessing one or more base tables; and responsive to a determination that the cost associated with dynamically generating the temporary result set against some sub-queries that may be reused by the one or more other sub-queries is less than the cost associated with the at least two or more sub-queries of the query accessing the one or more base tables, program instructions to generate an access path for a single shared common process, wherein the access path includes two or more different branches in a parse tree for each of two or more differing aspects within the single shared common process, wherein the two or more different branches return two or more results sets.

* * * * *